(12) United States Patent
Ford et al.

(10) Patent No.: US 10,326,776 B2
(45) Date of Patent: Jun. 18, 2019

(54) USER BEHAVIOR PROFILE INCLUDING TEMPORAL DETAIL CORRESPONDING TO USER INTERACTION

(71) Applicant: Forcepoint LLC, Austin, TX (US)

(72) Inventors: Richard Anthony Ford, Austin, TX (US); Brandon L. Swafford, Stamford, CT (US)

(73) Assignee: Forcepoint, LLC, Austin, TX (US)

( * ) Notice: Subject to any disclaimer, the term of this patent is extended or adjusted under 35 U.S.C. 154(b) by 0 days.

(21) Appl. No.: 15/978,905

(22) Filed: May 14, 2018

(65) Prior Publication Data

US 2018/0332072 A1 Nov. 15, 2018

Related U.S. Application Data

(63) Continuation of application No. 15/867,960, filed on Jan. 11, 2018, now Pat. No. 10,171,488.

(60) Provisional application No. 62/506,300, filed on May 15, 2017.

(51) Int. Cl.
*H04L 29/06* (2006.01)
*H04L 29/08* (2006.01)
*H04L 9/32* (2006.01)

(52) U.S. Cl.
CPC ............ *H04L 63/14* (2013.01); *H04L 9/3236* (2013.01); *H04L 63/1433* (2013.01); *H04L 67/306* (2013.01); *H04L 2209/38* (2013.01); *H04L 2209/56* (2013.01)

(58) Field of Classification Search
CPC ... H04L 63/14; H04L 67/306; H04L 63/1433; H04L 9/3236; H04L 2209/56; H04L 2209/38
See application file for complete search history.

(56) References Cited

U.S. PATENT DOCUMENTS

| | | | |
|---|---|---|---|
| 7,395,201 | B2 | 7/2008 | Shaw |
| 8,176,159 | B2 | 5/2012 | Kashi |
| 8,775,162 | B2 | 7/2014 | Shaw |
| 9,203,860 | B1 * | 12/2015 | Casillas ............. H04L 63/1433 |
| 9,224,008 | B1 | 12/2015 | De et al. |
| 9,253,181 | B2 | 2/2016 | Liu et al. |
| 9,275,345 | B1 | 3/2016 | Song et al. |
| 9,393,488 | B2 | 7/2016 | Brownlow et al. |

(Continued)

OTHER PUBLICATIONS guardtime.com, KSI Blockchain Technology, printed Jul. 13, 2017.

(Continued)

*Primary Examiner* — Darren B Schwartz
(74) *Attorney, Agent, or Firm* — Terrile, Cannatti & Chambers; Stephen A. Terrile

(57) ABSTRACT

A system, method, and computer-usable medium are disclosed for generating a cyber behavior profile comprising monitoring user interactions between a user and an information handling system; converting the user interactions into electronic information representing the user interactions, the electronic information representing the user interactions comprising temporal detail corresponding to the user interaction; and generating a user behavior profile based upon the electronic information representing the user interactions, the generating the user profile including a layer of detail corresponding to the temporal detail corresponding to the user interaction.

8 Claims, 8 Drawing Sheets

US 10,326,776 B2

Page 2

(56) References Cited

U.S. PATENT DOCUMENTS

| | | |
|---|---|---|
| 9,401,925 B1* | 7/2016 | Guo .................. H04L 63/1416 |
| 9,514,293 B1 | 12/2016 | Moritz et al. |
| 9,516,035 B1 | 12/2016 | Moritz et al. |
| 9,614,920 B1 | 4/2017 | Agarwal et al. |
| 9,633,201 B1* | 4/2017 | Katz .................... G06F 21/55 |
| 9,798,757 B2 | 10/2017 | Greene et al. |
| 9,911,290 B1 | 3/2018 | Zalewski et al. |
| 10,013,728 B2 | 7/2018 | Schechter et al. |
| 10,019,561 B1 | 7/2018 | Shelton et al. |
| 10,061,916 B1* | 8/2018 | Jiang .................. G06F 21/50 |
| 10,063,562 B1 | 8/2018 | Molina-Markham et al. |
| 10,091,180 B1 | 10/2018 | Moritz et al. |
| 10,108,791 B1* | 10/2018 | Masterman ......... G06F 21/32 |
| 10,114,935 B2 | 10/2018 | Das et al. |
| 2002/0083025 A1 | 6/2002 | Robarts et al. |
| 2003/0154406 A1 | 8/2003 | Honarvar et al. |
| 2003/0204720 A1 | 10/2003 | Schoen et al. |
| 2003/0217024 A1 | 11/2003 | Kocher |
| 2005/0097364 A1 | 5/2005 | Edeki et al. |
| 2006/0136332 A1 | 6/2006 | Ziegler |
| 2006/0195328 A1 | 8/2006 | Abraham et al. |
| 2007/0067853 A1* | 3/2007 | Ramsey .............. G06F 21/316 726/28 |
| 2007/0136573 A1 | 6/2007 | Steinberg |
| 2007/0206741 A1 | 9/2007 | Tiliks et al. |
| 2008/0148376 A1 | 6/2008 | Onozawa et al. |
| 2008/0170776 A1 | 7/2008 | Albertson et al. |
| 2008/0271143 A1 | 10/2008 | Stephens et al. |
| 2008/0313500 A1* | 12/2008 | Strauss .................. H04L 43/50 714/37 |
| 2009/0149247 A1 | 6/2009 | Esbensen et al. |
| 2009/0177626 A1 | 7/2009 | Lottero |
| 2009/0177979 A1 | 7/2009 | Garbow et al. |
| 2009/0199264 A1 | 8/2009 | Lang |
| 2009/0199296 A1* | 8/2009 | Xie .................... G06F 21/316 726/23 |
| 2010/0146622 A1 | 6/2010 | Nordstrom et al. |
| 2010/0205667 A1 | 8/2010 | Anderson et al. |
| 2010/0257580 A1 | 10/2010 | Zhao |
| 2010/0269175 A1 | 10/2010 | Stolfo et al. |
| 2011/0004520 A1 | 1/2011 | Chou et al. |
| 2011/0016534 A1 | 1/2011 | Jakobsson et al. |
| 2011/0106829 A1 | 5/2011 | Pradhan et al. |
| 2011/0212770 A1* | 9/2011 | Ocko .................. A63F 13/12 463/29 |
| 2011/0221568 A1 | 9/2011 | Giobbi |
| 2011/0296003 A1* | 12/2011 | McCann ............. G06F 21/316 709/224 |
| 2012/0079045 A1 | 3/2012 | Plotkin |
| 2012/0101970 A1 | 4/2012 | Zernik et al. |
| 2012/0137367 A1 | 5/2012 | Dupont et al. |
| 2012/0144468 A1 | 6/2012 | Pratt et al. |
| 2012/0188087 A1* | 7/2012 | Wang .................. H04L 67/303 340/657 |
| 2012/0258437 A1 | 10/2012 | Sadeh-Koniecpol et al. |
| 2012/0281885 A1 | 11/2012 | Syrdal et al. |
| 2012/0297477 A1 | 11/2012 | Raviv |
| 2013/0024239 A1* | 1/2013 | Baker .................. G06Q 40/06 705/7.28 |
| 2013/0042327 A1* | 2/2013 | Chow .................. G06F 21/316 726/28 |
| 2013/0044055 A1 | 2/2013 | Karmarkar et al. |
| 2013/0055348 A1 | 2/2013 | Strauss et al. |
| 2013/0055367 A1* | 2/2013 | Kshirsagar ........... G06F 21/316 726/6 |
| 2013/0091540 A1* | 4/2013 | Chen .................... H04W 4/21 726/1 |
| 2013/0097237 A1 | 4/2013 | Kothari et al. |
| 2013/0097701 A1* | 4/2013 | Moyle ................. G06F 21/552 726/22 |
| 2013/0111586 A1 | 5/2013 | Jackson |
| 2013/0124538 A1* | 5/2013 | Lee ...................... H04L 63/105 707/749 |
| 2013/0142363 A1 | 6/2013 | Amento et al. |
| 2013/0151515 A1* | 6/2013 | Davis .................. G06Q 50/01 707/736 |
| 2013/0252737 A1 | 9/2013 | Mescon et al. |
| 2013/0291099 A1* | 10/2013 | Donfried ............. G06Q 30/0637 726/22 |
| 2013/0305357 A1* | 11/2013 | Ayyagari ............. H04W 12/06 726/22 |
| 2014/0040309 A1 | 2/2014 | Meaney et al. |
| 2014/0040989 A1 | 2/2014 | Davis et al. |
| 2014/0053260 A1* | 2/2014 | Gupta .................. G06F 21/50 726/22 |
| 2014/0095419 A1 | 4/2014 | Gandhi et al. |
| 2014/0096215 A1* | 4/2014 | Hessler ............... H04L 63/0869 726/7 |
| 2014/0199663 A1 | 7/2014 | Sadeh-Koniecpol et al. |
| 2014/0282964 A1 | 9/2014 | Stubblefield et al. |
| 2014/0283016 A1 | 9/2014 | Sambamurthy et al. |
| 2014/0317726 A1 | 10/2014 | Turgeman et al. |
| 2014/0317734 A1* | 10/2014 | Valencia .............. G06F 21/552 726/22 |
| 2014/0323106 A1 | 10/2014 | Nunally |
| 2014/0333415 A1 | 11/2014 | Kursun |
| 2014/0344015 A1 | 11/2014 | Puertolas-Montanes et al. |
| 2014/0347479 A1 | 11/2014 | Givon |
| 2015/0067845 A1 | 3/2015 | Chari et al. |
| 2015/0109104 A1 | 4/2015 | Fadell et al. |
| 2015/0161386 A1 | 6/2015 | Gupta et al. |
| 2015/0180893 A1* | 6/2015 | Im ..................... H04L 63/1416 726/23 |
| 2015/0195300 A1* | 7/2015 | Adjaoute ........... H04L 63/1433 726/25 |
| 2015/0199523 A1* | 7/2015 | Hamilton ............ G06F 21/60 726/27 |
| 2015/0205944 A1* | 7/2015 | Turgeman ........... G06F 21/316 726/7 |
| 2015/0205957 A1 | 7/2015 | Turgeman et al. |
| 2015/0206102 A1 | 7/2015 | Cama et al. |
| 2015/0213246 A1 | 7/2015 | Turgeman et al. |
| 2015/0220734 A1 | 8/2015 | Nalluri et al. |
| 2015/0249718 A1 | 9/2015 | Huybregts et al. |
| 2015/0254467 A1 | 9/2015 | Leuthardt et al. |
| 2015/0324563 A1 | 11/2015 | Deutschmann et al. |
| 2015/0339477 A1 | 11/2015 | Abrams et al. |
| 2015/0358317 A1 | 12/2015 | Deutschmann et al. |
| 2015/0363770 A1 | 12/2015 | Ronca et al. |
| 2016/0029221 A1 | 1/2016 | Suarez Garcia et al. |
| 2016/0117500 A1 | 4/2016 | Li et al. |
| 2016/0197904 A1 | 7/2016 | Taratine et al. |
| 2016/0203316 A1 | 7/2016 | Mace et al. |
| 2016/0212172 A1 | 7/2016 | Senanayake et al. |
| 2016/0241579 A1 | 8/2016 | Roosenraad et al. |
| 2016/0306844 A1 | 10/2016 | Frank et al. |
| 2016/0314471 A1* | 10/2016 | Gerber ................ G06Q 20/4016 |
| 2016/0337390 A1 | 11/2016 | Sridhara et al. |
| 2017/0033932 A1 | 2/2017 | Truu et al. |
| 2017/0041148 A1 | 2/2017 | Pearce |
| 2017/0134412 A1 | 5/2017 | Cheng et al. |
| 2017/0140279 A1 | 5/2017 | Turgeman |
| 2017/0161478 A1 | 6/2017 | Stavrou et al. |
| 2017/0230417 A1 | 8/2017 | Amar et al. |
| 2017/0230418 A1 | 8/2017 | Amar et al. |
| 2017/0243223 A1 | 8/2017 | Kolotinsky et al. |
| 2017/0257358 A1 | 9/2017 | Ebrahimi et al. |
| 2017/0279801 A1 | 9/2017 | Andrade |
| 2017/0302748 A1* | 10/2017 | Chakraborty ........ H04L 67/22 |
| 2018/0039990 A1 | 2/2018 | Lindemann |
| 2018/0144110 A1 | 5/2018 | Creamer et al. |
| 2018/0158165 A1 | 6/2018 | Hodge |
| 2018/0188916 A1 | 7/2018 | Lyons et al. |
| 2018/0241761 A1* | 8/2018 | Bania .................. H04L 63/1425 |
| 2018/0255080 A1 | 9/2018 | Paine |
| 2018/0310171 A1 | 10/2018 | Whitaker et al. |

OTHER PUBLICATIONS

Guy Zyskind et al., Decentralizing Privacy: Using Blockchain to Protect Personal Data, 2015 IEEE CS Security and Privacy Work-

(56) References Cited

OTHER PUBLICATIONS shops, pp. 180-184, http://inpluslab.sysu.edu.cn/files/Paper/Security/Decentralizing_Privacy__Using_Blockchain_To_Protect_Personal_Data.pdf.

Malek Ben Salem et al., A Survey of Insider Attack Detection Research, Insider Attack and Cyber Security: Beyond the Hacker, Springer, 2008 https://pdfs.semanticscholar.org/3135/eb4b37aa487dd5f06dfa178bbc1d874f3cdf.pdf.

Amos Azaria et al., Behavioral Analysis of Insider Threat: A Survey and Bootstrapped Prediction in Imbalanced Data, Journal of Latex Class Files, vol. 6, No. 1, Jan. 2007.

Mike Hintze et al., Comparing the Benefits of Pseudonymization and Anonymization Under the GDPR, Privacy Analytics, White Paper, 2017.

\* cited by examiner

USER BEHAVIOR PROFILE INCLUDING TEMPORAL DETAIL CORRESPONDING TO USER INTERACTION

BACKGROUND OF THE INVENTION

Field of the Invention

The present invention relates in general to the field of computers and similar technologies, and in particular to software utilized in this field. Still more particularly, it relates to a method, system and computer-usable medium for implementing a user behavior profile.

Description of the Related Art

Users interact with physical, system, data, content and services resources of all kinds, as well as each other, on a daily basis. Each of these interactions, whether accidental or intended, could pose some degree of security risk to the owner of such resources depending on the behavior of the user. In particular, the actions of a trusted user may become malicious as a result of being subverted, compromised or radicalized due to any number of internal or external factors or stressors. For example, financial pressure, political idealism, irrational thoughts, or other influences may adversely affect a user's intent and/or behavior. Furthermore, such an insider threat may be intimately familiar with how systems operate, how they are protected, and how weaknesses can be exploited.

Both physical and cyber security efforts have traditionally been oriented towards preventing or circumventing external threats. Physical security approaches have typically focused on monitoring and restricting access to tangible resources. Likewise, cyber security approaches have included network access controls, intrusion detection and prevention systems, machine learning, big data analysis, software patch management, and secured routers. Yet little progress has been made in addressing the root cause of security breaches, primarily because the threat landscape is constantly shifting faster than current thinking, which always seems to be one step behind technological change.

In particular, current data loss prevention (DLP) approaches primarily focus on enforcing policies for compliance, privacy, and the protection of intellectual property (IP). Such approaches typically cover data at rest, in motion, and in use, across multiple channels including email, endpoints, networks, mobile devices, and cloud environments. However, the efficacy of such policies typically relies on enforcement of a static set of rules governing what a user can and cannot do with certain data. Various approaches for attempting to detect insider threats are also known. For example, one approach to detecting such threats includes performing user profiling operations to infer the intent of user actions. Another approach is to perform behavioral analysis operations when users are interacting with a system.

Nonetheless, many organizations first turn to technology to address insider threats, which include malicious cyber behavior by individuals who have legitimate rights to access and modify an organization's resources, such as systems, data stores, services and facilities. While the number of malicious users may be small (e.g., less than 0.1% of all users in an organization), they may wreak serious financial and other types of damage. Accordingly, some organizations have implemented various machine learning approaches to identify anomalous or malicious user behavior.

However, human behavior is often unpredictable and valid machine learning training data may be difficult to obtain. Furthermore, identifying an impersonator that appears legitimate can prove problematic, especially if their observed interactions with resources are limited. Likewise, it is often difficult to detect a trusted insider behaving in ways that appear normal but conceal nefarious motives. Human computers users are subject to the normality of life to include, vacations, job detail changes, interpersonal relationship stress and other daily occurrences making traditional behavioral baseline analysis difficult without accounting for intermittent pattern features. Moreover, organizations typically have limited technical resources to devote to an insider threat program and are constrained in the types of data they can proactively collect and analyze.

SUMMARY OF THE INVENTION

A method, system and computer-usable medium are disclosed for generating a cyber behavior profile comprising monitoring user interactions between a user and an information handling system; converting the user interactions into electronic information representing the user interactions, the electronic information representing the user interactions comprising multi-layered electronic information, each layer of the multi-layered electronic information corresponding to a respective layer of user interaction; and generating a unique multi-dimensional cyber behavior profile based upon the multi-layered electronic information representing the user interactions.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A method, system and computer-usable medium are disclosed for detecting acceptable, anomalous, and malicious user behavior. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a mobile device such as a tablet or smartphone, a connected "smart device," a network appliance, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more storage systems, one or more network ports for communicating externally, as well as various input and output (I/O) devices, such as a keyboard, a mouse, and a graphics display.

Figure 1:
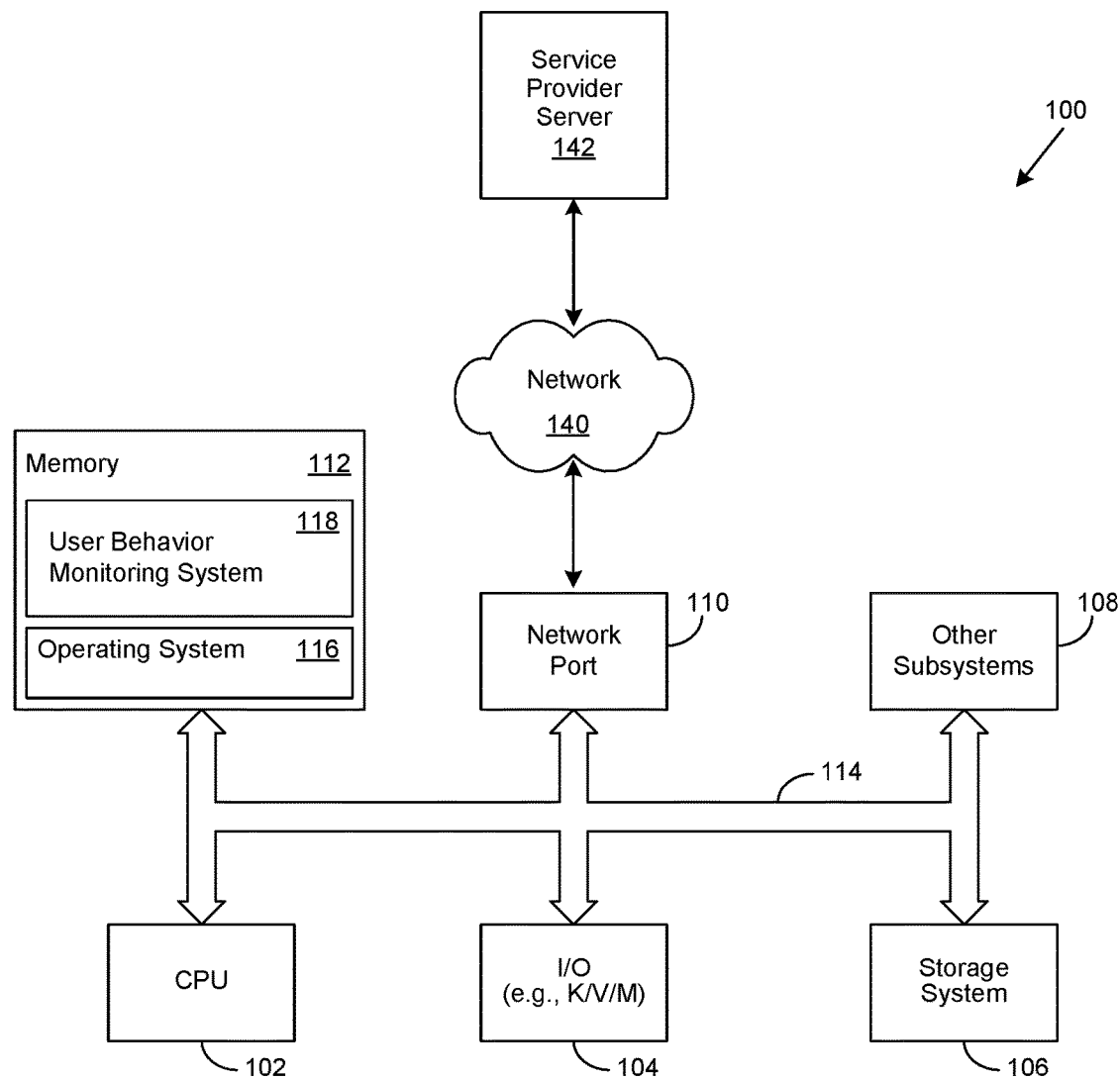
FIG. 1 depicts an exemplary client computer in which the present invention may be implemented.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a storage system 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further includes operating system (OS) 116 and in various embodiments may also include a user behavior monitoring system 118. In one embodiment, the information handling system 100 is able to download the user behavior monitoring system 118 from the service provider server 142. In another embodiment, the user behavior monitoring system 118 is provided as a service from the service provider server 142.

In various embodiments, the user behavior monitoring system 118 performs a detection operation to determine whether a particular behavior associated with a given user is acceptable, unacceptable, anomalous, or malicious. In certain embodiments, a behavior may include various processes performed at the behest of a user, such as a physical or cyber behavior, described in greater detail herein. In various embodiments, the detection operation is performed to attribute such processes to the user associated with the acceptable, unacceptable, anomalous, or malicious behavior. In certain embodiments, the detection operation improves processor efficiency, and thus the efficiency of the information handling system 100, by automatically identifying acceptable, unacceptable, anomalous, or malicious behavior.

As will be appreciated, once the information handling system 100 is configured to perform the acceptable, unacceptable, anomalous, or malicious behavior detection operation, the information handling system 100 becomes a specialized computing device specifically configured to perform the acceptable, anomalous, or malicious behavior detection operation (i.e., a specialized user-centric information handling system) and is not a general purpose computing device. Moreover, the implementation of the user behavior detection monitoring system 118 on the information handling system 100 improves the functionality of the information handling system 100 and provides a useful and concrete result of automatically detecting acceptable, anomalous, and malicious behavior associated with a user.

Figure 2:
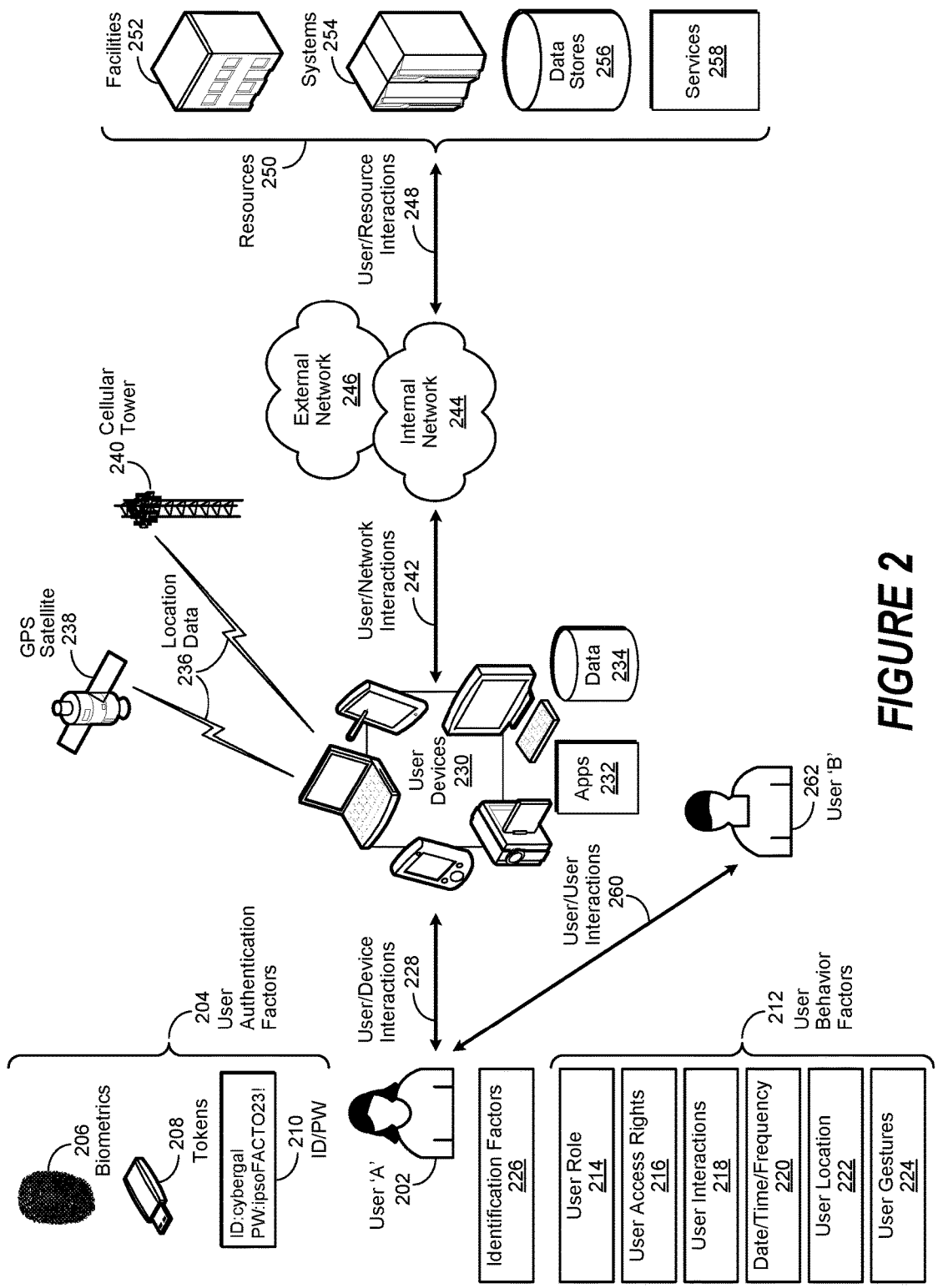
FIG. 2 is a simplified block diagram of electronically-observable user behavior elements and their interrelationship.

FIG. 2 is a simplified block diagram of electronically-observable user behavior elements implemented in accordance with an embodiment of the invention and their interrelationship. As used herein, electronically-observable user behavior broadly refers to any behavior exhibited or enacted by a user that can be electronically observed. In various embodiments, user behavior may include a user's physical behavior, cyber behavior, or a combination thereof. As likewise used herein, physical behavior broadly refers to any user behavior occurring within a physical realm, such as speaking, gesturing, facial patterns or expressions, walking, and so forth. More particularly, physical behavior may include any activity enacted by a user that can be objectively observed, or indirectly inferred, within a physical realm.

A physical behavior element, as likewise used herein, broadly refers to a user's behavior in the performance of a particular action within a physical realm. As an example, a user, such as user 'A' 202 or 'B' 262, may attempt to use an electronic access card to enter a secured building. In this example, the use of the access card to enter the building is the action and the reading of the access card makes the user's physical behavior electronically-observable. As another example, user 'A' 202 may physically deliver a document to user 'B' 262, which is captured by a video surveillance system. In this example, the physical delivery of the document to the other user 'B' 262 is the action and the video record of the delivery makes the user's physical behavior electronically-observable.

Cyber behavior, as used herein, broadly refers to any user behavior occurring within cyberspace. More particularly, cyber behavior may include physical, social, or mental activities enacted by a user that can be objectively observed, directly or indirectly, or indirectly inferred, within cyberspace. As likewise used herein, cyberspace broadly refers to a network environment, such as an internal 244 or external 246 network, capable of supporting communication of information between two or more entities. In various embodiments, the entity may be a user, such as user 'A' 202 or 'B' 262, a user device 230, or various resources 250. In certain embodiments, the entities may include various user devices 230 or resources 250 operating at the behest of a user, such as user 'A' 202 or 'B' 262. In various embodiments, the communication between the entities may include audio, image, video, text, or binary data.

In various embodiments, the communication of the information may take place in real-time or near-real-time. As an example, a cellular phone conversation may be used to communicate information in real-time, while an instant message (IM) exchange may be used to communicate information in near-real-time. In certain embodiments, the communication of the information may take place asynchronously. For example, an email message may be stored on a user device 230 when it is offline. In this example, the information may be communicated to its intended recipient once the user device 230 gains access to an internal 244 or external 246 network.

A cyber behavior element, as likewise used herein, broadly refers to a user's behavior during the performance of a particular action within cyberspace. As an example, user 'A' 202 may use a user device 230 to browse a particular web page on a news site on the Internet. In this example, the individual actions performed by user 'A' 202 to access the web page constitute a cyber behavior element. As another example, user 'A' 202 may use a user device 230 to download a data file from a particular system 254. In this example, the individual actions performed by user 'A' 202 to download the data file, including the use of one or more user authentication factors 204 for user authentication, constitute a cyber behavior element. In these examples, the actions are enacted within cyberspace, which makes them electronically-observable.

In various embodiments, a physical or cyber behavior element may include one or more user behavior activities. In various embodiments, a user behavior activity may be enriched by context about the object upon which the activity is acted. A physical or cyber behavior activity, as used herein, broadly refers to one or more discrete actions performed by a user, such as user 'A' 202 or 13' 262, to enact a corresponding physical or cyber behavior element. In various embodiments, such physical or cyber behavior activities may include the use of user authentication factors 204, user behavior factors 212, or a combination thereof, in the enactment of a user's physical or cyber behavior. In certain embodiments, the user authentication factors 204 are used in authentication approaches familiar to skilled practitioners of the art to authenticate a user, such as user 'A' 202 or 'B' 262. In various embodiments, the user authentication factors 204 may include biometrics 206 (e.g., a finger print, a retinal scan, etc.), security tokens 208 (e.g., a dongle containing cryptographic keys), or a user identifier/password (ID/PW) 210.

In certain embodiments, the user behavior factors 212 may include the user's role 214 (e.g., title, position, role, etc.), the user's access rights 216, the user's interactions 218, and the date/time/frequency 220 of those interactions 218. In certain embodiments, the date/time/frequency 220 user behavior factor 212 may be implemented as ontological or societal time, or a combination thereon. As used herein, ontological time broadly refers to how one instant in time relates to another in a chronological sense. As an example, a first user behavior enacted at 12:00 noon on May 17, 2017 has occurred prior to a second user behavior enacted at 6:39 PM on May 18, 2018. Skilled practitioners of the art will recognize one value of ontological time is to determine the order in which various user behaviors have been enacted.

As likewise used herein, societal time broadly refers to the correlation of certain user behavior elements, user behavior activities, user identification factors 226, or user behavior factors 212 to one or more instants in time. As an example, user 'A' 202 may access a system 254 to download a customer list at 3:47 PM on Nov. 3, 2017. Analysis of their user behavior profile indicates that it is not unusual for user 'A' 202 to download the customer list on a weekly basis. However, examination of their user behavior profile also indicates that user 'A' 202 forwarded the downloaded customer list in an email to user 'B' 262 at 3:49 PM that same day. Furthermore, there is no record in their user behavior profile that user 'A' 202 has ever communicated with user 'B' 262 in the past. Moreover, it may be determined, as described in greater detail herein, that user B' 262 may be employed by a competitor. Accordingly, the correlation of user 'A' 202 downloading the customer list at one point in time, and then forwarding the customer list to user 'B' 262 at a second point in time shortly thereafter, is an example of societal time.

In a variation of the prior example, user 'A' 202 may download the customer list at 3:47 PM on Nov. 3, 2017. However, instead of immediately forwarding the customer list to user 'B' 262, user 'A' 202 leaves for a two week vacation. Upon their return, they forward the previously-downloaded customer list to user 'B' 262 at 9:14 AM on Nov. 20, 2017. From an ontological time perspective, user 'A' 202 it has been two weeks since they accessed a system 254 to download the customer list. However, from a societal time perspective, they have still forwarded the customer list to user 'B' 262, despite two weeks having elapsed since the customer list was originally downloaded. In certain embodiments, a security system may be implemented to decay the risk associated with a user according to the amount of ontological time that has lapsed since their last observed policy violation. To continue the previous example, a first user may have committed a policy violation two work weeks earlier. However, nothing in their user behavior since has indicated any further anomalous or abnormal activity, despite interacting with various systems and resources on a daily basis. Accordingly, the security system gradually lowers the risk associated with the first user over the two week period. In contrast, the second user may commit the same policy violation just before leaving for a two week vacation, during which they have no interaction with the systems and resources they typically use.

Accordingly, the correlation of user 'A' 202 downloading the customer list at one point in time, and then forwarding the customer list to user 'B' 262 at a much later point in time, is another example of societal time. More particularly, it may be inferred that the intent of user 'A' 202 did not changed during the two weeks they were on vacation. Furthermore, user 'A' 202 may have attempted to mask an intended malicious act by letting some period of time elapse between the time they originally downloaded the customer list and when they eventually forwarded it to user 'B' 262. From the perspective of ontological time, the two work weeks and the two week vacation are equivalent. Consequently, certain systems may assess the same level of risk for both the first and second user. However, from the perspective of societal time, the risk associated with the policy violation occurring just before the second user left for a two week vacation may in fact be higher than the risk associated with first user, who committed the same policy violation two work weeks earlier. From the foregoing, those of skill in the art will recognize that the use of societal time may be advantageous in determining whether a particular user behavior is acceptable, anomalous or malicious.

In various embodiments, the user behavior factors 212 may likewise include the user's location 222 when the interactions 218 are enacted, and user gestures 224 used to enact the interactions 218. In certain embodiments, the user gestures 224 may include key strokes on a keypad, a cursor movement, a mouse movement or click, a finger swipe, tap, or other hand gesture, an eye movement, or some combination thereof. In various embodiments, the user gestures 224 may likewise include the cadence of the user's keystrokes, the motion, force and duration of a hand or finger gesture, the rapidity and direction of various eye movements, or some combination thereof. In one embodiment, the user gestures 224 may include various audio or verbal commands performed by the user.

In various embodiments, the user behavior factors 212 may include additional context associated with the captured behavior of the user. For example, the additional context might indicate the user was on vacation, the user is in a new job role, the user is being terminated in 30 days, and so forth. Additionally, the additional context could be more complex to include changes in user communication relationships or semantics of created content and communications. In certain embodiments, the additional context might include tags to verbosely contextualize a smaller design element. In certain embodiments, the tags may be generated from meta analytic sources. In certain embodiments, the additional context may be tagged post-event and then associated with various user behavior factors. In certain embodiments, the association of the additional context may be accomplished via a blockchain block within a user behavior profile blockchain, described in greater detail herein, implemented with appropriate time stamping to allow for versioning over time.

In certain embodiments, the user interactions 218 may include user/device 228, user/network 242, user/resource 248, user/user 260 interactions, or some combination thereof. In various embodiments, the user/device 228 interactions include an interaction between a user, such as user 'A' 202 or 'B' 262 and a user device 230. As used herein, a user device 230 refers to an information processing system such as a personal computer, a laptop computer, a tablet computer, a personal digital assistant (PDA), a smart phone, a mobile telephone, or other device that is capable of processing and communicating data. In certain embodiments, the user device 230 is used to communicate data through the use of an internal network 244, an external network 246, or a combination thereof.

In various embodiments, the cyber behavior element may be based upon a machine readable representation of some, or all of, one or more user identification factors 226. In various embodiments, the user identification factors 226 may include biometric information, personality type information, technical skill level, financial information location information, peer information, social network information, or a combination thereof. Examples of personality type information include various descriptor information commonly associated with Jungian, Meyers-Briggs Type Indicator (MBTI), NEO Personality Inventory (NEO PI-I), five factor model (FFM), and other known approaches to describing personality types.

The user identification factors 226 may likewise include travel-related information, expense account information, paid time off (PTO) information, data analysis information, personally sensitive information (PSI), personally identifiable information (PII), or a combination thereof. Likewise, the user identification factors 226 may include insider information, configuration information, third party information, or a combination thereof. Skilled practitioners of the art will recognize that many such embodiments are possible. Accordingly, the foregoing is not intended to limit the spirit, scope or intent of the invention.

In certain embodiments, the user device 230 is configured to receive location data 236, which is used as a data source for determining the user's location 222. In one embodiment, the location data 236 may include Geographical Positioning System (GPS) data provided by a GPS satellite 238. In another embodiment the location data 236 may include location data 236 provided by a wireless network, such as from a cellular network tower 240. In yet another embodiment (not shown), the location data 236 may include various Internet Protocol (IP) address information assigned to the user device 230. In yet still another embodiment (also not shown), the location data 236 may include recognizable structures or physical addresses within a digital image or video recording.

In various embodiments, the user devices 230 may also include an input device (not shown), such as a keypad, magnetic card reader, token interface, biometric sensor, digital camera, video surveillance camera, and so forth. In these embodiments, such user devices 230 may be directly, or indirectly, connected to a particular facility 252 or system 254. As an example, the user device 230 may be directly connected to an ingress/egress system, such as an electronic lock on a door or an access gate of a parking garage. As another example, the user device 230 may be indirectly connected to a physical security mechanism through a dedicated security network.

In certain embodiments, the user/device 228 interaction may include interaction with a user device 230 that is not connected to a network at the time the interaction occurs. As an example, user 'A' 202 or 'B' 262 may interact with a user device 230 that is offline, using applications 232, accessing data 234, or a combination thereof, it contains. Those user/device 228 interactions, or their result, may be stored on the user device 230 and then be accessed or retrieved at a later time once the user device 230 establishes a connection to the internal 244 or external 246 networks.

In various embodiments, the user/network 242 interactions may include interactions with an internal 244 network, an external 246 network, or some combination thereof. In these embodiments, the internal 244 and the external 246 networks may include a public network, such as the Internet, a physical private network, a virtual private network (VPN), The Onion Router (TOR) network (used for enabling anonymous communication), or any combination thereof. In certain embodiments, the internal 244 and external 246 networks may likewise include a wireless network, including a personal area network (PAN), based on technologies such as Bluetooth. In various embodiments, the wireless network may include a wireless local area network (WLAN), based on variations of the IEEE 802.11 specification, commonly referred to as WiFi. In certain embodiments, the wireless network may include a wireless wide area network (WWAN) based on an industry standard including various 3G, 4G and 5G technologies.

In certain embodiments the user/resource 248 interactions may include interactions with various resources 250. In certain embodiments, the resources 250 may include various facilities 252 and systems 254, either of which may be physical or virtual, as well as data stores 256 and services 258. In various embodiments, the user/user 260 interactions may include interactions between two or more users, such as user 'A' 202 and 'B' 262. In these embodiments, the user/user interactions 260 may be physical, such as a face-to-face meeting, via a user/device 228 interaction, a user/network 242 interaction, a user/resource 248 interaction, or some combination thereof.

In one embodiment, the user/user 260 interaction may include a face-to-face verbal exchange between two users. In another embodiment, the user/user 260 interaction may include a written exchange, such as text written on a sheet of paper, between two users. In yet another embodiment, the user/user 260 interaction may include a face-to-face exchange of gestures, such as a sign language exchange, between two users. Those of skill in the art will recognize that many such examples of user/device 228, user/network 242, user/resource 248, and user/user 260 interactions are possible. Accordingly, the foregoing is not intended to limit the spirit, scope or intent of the invention.

In certain embodiments, the user authentication factors 204 are used in combination to perform multi-factor authentication of a user, such as user 'A' 202 or B' 262. As used herein, multi-factor authentication broadly refers to approaches requiring two or more authentication factors. In general, multi-factor authentication includes three classes of user authentication factors 204. The first is something the user knows, such as a user ID/PW 210. The second is something the user possesses, such as a security token 208. The third is something that is inherent to the user, such as a biometric 206.

In various embodiments, multi-factor authentication is extended to include a fourth class of factors, which includes one or more user behavior factors 212, one or more user identification factors 226, or a combination thereof. In these embodiments, the fourth class of factors includes user behavior elements the user has done, is currently doing, or is expected to do in the future. In certain embodiments, multi-factor authentication is performed on recurring basis. In one embodiment, the multi-factor authentication is performed at certain time intervals during the enactment of a particular user behavior. In another embodiment, the time interval is uniform. In yet another embodiment, the time interval may vary or be random. In yet still another embodiment, the multi-factor authentication is performed according to the enactment of a particular user behavior, such as accessing a different resource 250.

In various embodiments, certain combinations of the enhanced multi-factor authentication described herein are used according to the enactment of a particular user behavior. From the foregoing, those of skill in the art will recognize that the addition of such a fourth class of factors not only strengthens current multi-factor authentication approaches, but further, allows the factors to be more uniquely associated with a given user. Skilled practitioners of the art will likewise realize that many such embodiments are possible. Accordingly, the foregoing is not intended to limit the spirit, scope or intent of the invention.

Figure 3:
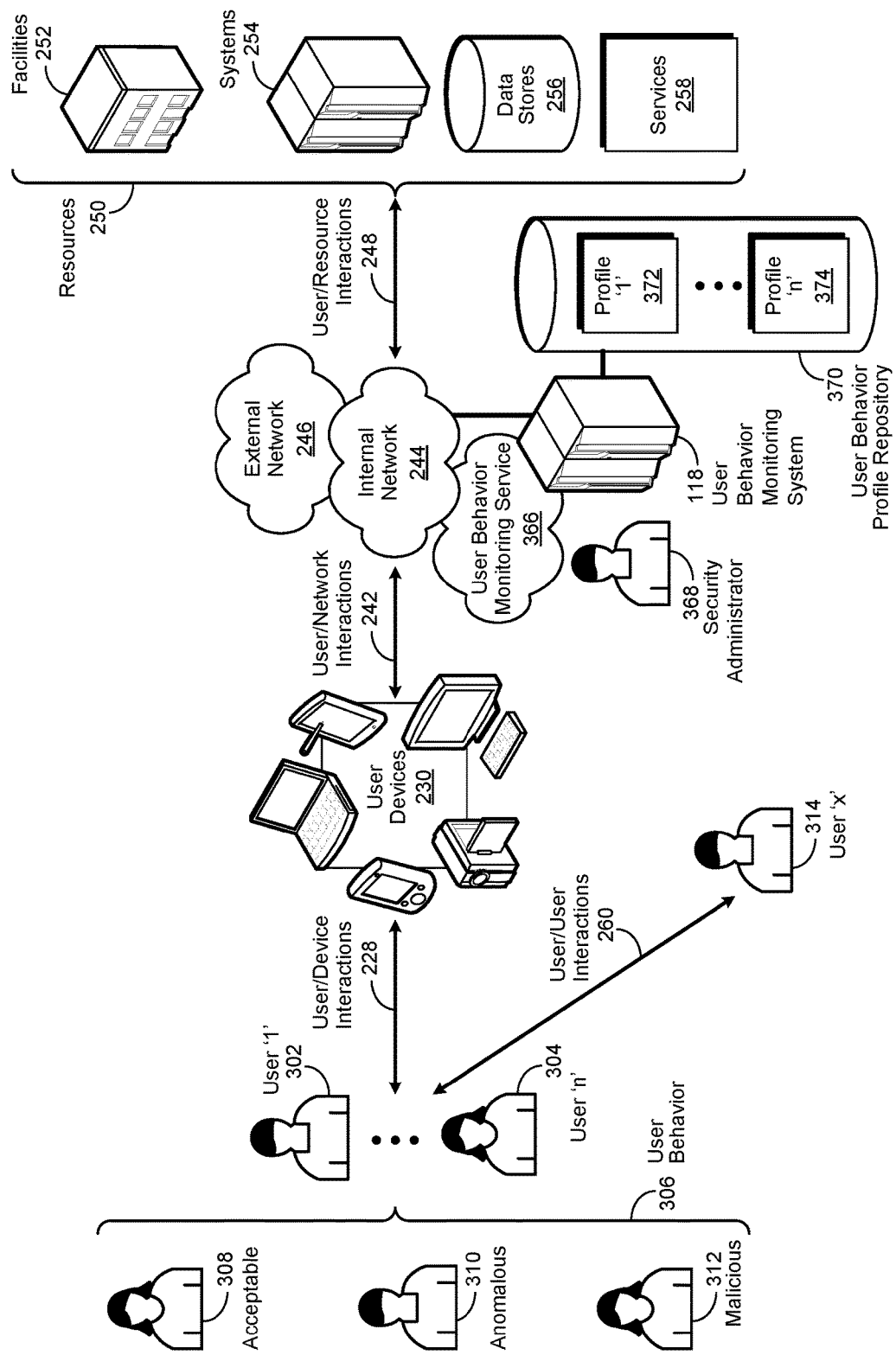
FIG. 3 is a simplified block diagram of a user behavior monitoring system implemented to identify acceptable, anomalous, and malicious user behavior.

FIG. 3 is a simplified block diagram of a user behavior monitoring system implemented in accordance with an embodiment of the invention to detect acceptable, anomalous, and malicious user behavior. In various embodiments, user behavior profiles '1' 372 through 'n' 374 are respectively generated, as described in greater detail herein, for users '1' 302 through 'n' 304. As used herein, a user behavior profile (also referred to as a cyber behavior profile) broadly refers to a collection of various enactments of user behavior associated with a particular user, such as users '1' 302 through 'n' 304.

In certain embodiments, as described in greater detail herein, individual enactments of user behavior may be represented as one or more user behavior elements, which in turn may be associated with a corresponding user behavior profile. In certain embodiments, as likewise described in greater detail herein, individual behavior elements may include one or more user behavior activities, which in turn may refer to one or more activities performed by a user. Such activities may include the use of one or more user authentication, identification or behavior factors, likewise described in greater detail herein.

In certain embodiments, a user behavior profile may be implemented as a multi-faceted user behavior profile, where each facet corresponds to a particular user authentication, identification or behavior factor. As an example, one facet of a multi-faceted user behavior profile may correspond to the use of a particular biometric authentication factor, while another facet may correspond to a user's access rights to a certain system. In certain embodiments, a multi-faceted user behavior profile may be further implemented as a multi-dimensional user behavior profile, where each user authentication, identification or behavior factor associated with a facet may have a corresponding degree of dimensional detail.

As an example, a biometric authentication factor associated with a retinal scan may simply have the dimension of "match" or "not match," which provides a low degree of dimensional detail. Conversely, its associated dimension information may include actual retinal pattern correlation scores, which provides a higher degree of dimensional detail. As yet another example, a user behavior factor associated with a user gesture, such as keyboard cadence, may simply indicate whether the user's keyboard usage is within an acceptable range of rhythm and speed metrics, which provides a low degree of dimensional detail. In contrast, its associated dimensional information may include key logger information related to which keys were struck, in which order, at which point in time, which provides a higher degree of dimensional detail.

As yet another example, a user behavior factor associated with date/time/frequency, such as when a particular file is accessed, may simply indicate which date the file was accessed, but not the exact time or how often. Alternatively, its associated dimensional information may include exact times the file was accessed, which by extension may indicated how frequent or infrequently the file was accessed during a particular temporal interval. In this example, the lack of the exact time or how often the file was accessed provides a low degree of dimensional detail. Conversely, its provision provides a high degree of dimensional detail, which may prove advantageous when assessing risk associated with the user accessing the file.

In certain embodiments, a user behavior profile may be implemented as a multi-layered user behavior profile, where each layer corresponds to a certain level of detail corresponding to a particular user authentication, identification or behavior factor. In certain embodiments, the certain level of detail corresponds to a certain level of temporal detail corresponding to a particular user authentication, identification or behavior factor. As an example, one temporal detail layer of a multi-layered user behavior profile may correspond to a user behavior factor associated with user interactions, described in greater detail herein, over a 30 day period. In this example, the various user interactions enacted during the 30 day period may be abstracted to simply represent which user/device 228, user/network 242, user/resource 248, and user/user 260 interactions took place, with their corresponding frequency. Alternatively, another temporal detail layer may provide the date/time/frequency of each interaction, not just during the 30 day period, but each 24 hour period therein. It will be appreciated that such a temporal level of detail related to such interactions may provide useful trend information, which in turn can be used advantageously when assessing security risk.

It will be appreciated that over time, the user behavior of a particular user, such as user 'A' 202, will be uniquely different and distinct from another user, such as user 'B' 262. Accordingly, user behavior profile '1' 372 will uniquely reflect the user behavior of user '1' 302, just as user behavior profile 'n' 374 will uniquely reflect the user behavior of user 'n' 310. As an example, user 'A' 202 may have a user role of sales administrator. Upon arriving at their office in the morning, the user consistently checks their email, item by item, responding to each in turn, followed by processing expense reports for field sales personnel. Then, after lunch, the user may access and review sales forecasts on an internal system 254. Furthermore, the user may exhibit sporadic keyboard entry interspersed with extensive mouse activity, or user gestures, when perusing the sales forecasts. Moreover, personality type information associated with user 'A' 202 may indicate the user consistently exhibits a positive, outgoing attitude. In this example, the sequence of the activities enacted by user 'A' 202 throughout the day, and their frequency, correspond to the date/time/frequency 220 user behavior factor described in the descriptive text associated with FIG. 2. Likewise, the keyboard cadence and other user gestures are examples of granular user behavior factors, while the personality type information is an example of an abstract user behavior factor.

As another example, user 'B' 262 may have a user role of financial controller. Upon arriving at their office in the morning, the user usually scans their email messages, responding only to those that are urgent. Then they check the daily budget status of each department to see whether they are conforming to their respective guidelines. After lunch, the user may follow up on emails that are less urgent, followed by updating the organization's financials, likewise on an internal system 254. Additionally, the user may exhibit deliberate keyboard entry interspersed with iterative mouse activity, or user gestures, when updating financial information. Moreover, personality type information associated with user 'B' 262 may indicate they consistently exhibit a reserved, introspective and contemplative attitude. As in the prior example, the sequence of the activities enacted by user 'B' 262 throughout the day, and their frequency, correspond to the date/time/frequency 220 user behavior factor described in the descriptive text associated with FIG. 2. Likewise, as before, the keyboard cadence and other user gestures are examples of granular user behavior factors, while the personality type information is an example of an abstract user behavior factor.

It will likewise be appreciated that the user behavior of a particular user may evolve over time. As an example, certain user behavior exhibited by a user during the first month of assuming a new position within an organization may be quite different than the user behavior exhibited after being in the position for six months. To continue the example, the user may be somewhat tentative when learning to access and interact with unfamiliar resources 250 in the first month in the position, but by the sixth month, such access and interaction is commonplace and routine.

In various embodiments, a user behavior monitoring system 118 is implemented to observe user behavior 306 at one or more points of observation within a cyberspace environment. In certain embodiments, the points of observation may occur during various user interactions, such as user/device 228, user/network 242, user/resource 248, and user/user 260 interactions described in greater detail herein. As an example, a user/user 260 interaction may include an interaction between an individual user '1' 302 through 'n' 304 with user 'x' 314. In certain embodiments, the point of observation may include cyber behavior of various kinds within an internal 244 network. As an example, cyber behavior within an internal 244 network may include a user accessing a particular internal system 254 or data store 256. In certain embodiments, the point of observation may include cyber behavior of various kinds within an external 246 network. As an example, cyber behavior within an external 246 network may include a user's social media activities or participation in certain user forums.

In various embodiments, the user behavior profile '1' 372 through 'n' 374 associated with a given user, such as user '1' 302 through 'n' 304, is used by the user behavior monitoring system 118 to compare the user's current user behavior 306 to past user behavior 306. If the user's current user behavior 306 matches past user behavior 306, then the user behavior monitoring system 118 may determine that the user's user behavior 306 is acceptable 308. If not, then the user behavior monitoring system 118 may determine that the user's user behavior 306 is anomalous 310 or malicious 312.

However, as described in greater detail herein, a change in a particular user's user behavior 306 over time may not be anomalous 310 or malicious 312. Instead, it may be acceptable 308 behavior that simply evolves over time as a natural result of day-to-day user/device 228, user/network 242, user/resource 248, or user/user 260 interactions. In certain embodiments, the user behavior monitoring system 118 is implemented to determine whether such changes in a user's user behavior 306 over time are acceptable 308, anomalous 310, or malicious 312. In certain embodiments, a multi-layered user behavior profile may be implemented in combination with the user behavior monitoring system 118 to make this temporal determination. In certain embodiments, a multi-faceted or multi-dimensional user behavior profile may likewise be implemented in combination with a multi-layer user behavior profile and the user behavior monitoring system 118 to make such determinations. In these embodiments, the method by which the multi-faceted, multi-dimensional, or multi-layered user behavior profile is implemented with the user behavior monitoring system 118 is a matter of design choice.

It will be appreciated that anomalous 310 user behavior 306 may include inadvertent or compromised user behavior 306. For example, the user may have innocently miss-entered a request for data that is proprietary to an organization. As another example, the user may be attempting to access confidential information as a result of being compromised. As yet another example, a user may attempt to access certain proprietary data from their home, over a weekend, and late at night. In this example, the user may be working from home on a project with an impending deadline. Accordingly, the attempt to access the proprietary data is legitimate, yet still anomalous 310 as the attempt did not occur during the week, from the user's place of employment, during normal work hours. However, the user behavior 306 may manifest in context with consistent remote access patterns and provide sufficient evidence to determine the nature of activity.

Likewise, the user behavior monitoring system 118 may determine that the user's user behavior 306 to be malicious 312. As yet another example, an impostor may be attempting to pose as a legitimate user in an attempt to exploit one or more resources 250. In this example, the attempt to exploit one or more resources 250 is malicious 312 user behavior 306. As yet still another example, a legitimate user may be attempting to increase their level of access to one or more resources 250. In this example, the user's attempt to increase their level of access is malicious 312 user behavior 306.

To further extend these examples, such resources may include various facilities 252, systems 254, data stores 256, or services 258. In various embodiments, the user behavior monitoring system 118 may be implemented to block a user if it is determined their user behavior 306 is anomalous 310 or malicious 312. In certain embodiments, the user behavior monitoring system 118 may be implemented modify a request submitted by a user if it is determined the request is anomalous 310 or malicious 312. In various embodiments, the user behavior system 118 may be implemented to modify an outcome. For example, the user behavior system 118 may encrypt a file when a copy operation is detected.

In one embodiment, the user behavior monitoring system 118 may be implemented as a stand-alone system. In another embodiment, the cyber behavior monitoring system 118 may be implemented as a distributed system. In yet another embodiment, the cyber behavior monitoring system 118 may be implemented as a virtual system, such as an instantiation of one or more virtual machines (VMs). In yet still another embodiment, the user behavior monitoring system 118 may be implemented as a user behavior monitoring service 366. Skilled practitioners of the art will recognize that many such embodiments and examples are possible. Accordingly, the foregoing is not intended to limit the spirit, scope or intent of the invention.

In various embodiments, user behavior detection operations are initiated by first authenticating a user, such as user '1' 302 through 'n' 304. Once authenticated, the user's respective user behavior profile is retrieved, followed by ongoing monitoring of the user's user behavior activities. The user's user behavior activities are then processed to determine an associated user behavior element, which in turn is compared to the user's user behavior profile. In various embodiments, the user behavior profile is continually amended and refined based on the continuous interaction with the system over time.

A determination is then made whether the user's current user behavior element is acceptable. If so, then the user's current user behavior element is marked as acceptable. It will be appreciated that in various embodiments, otherwise acceptable behavior may be determined to be anomalous or malicious in certain situations. For example, the printing or copying of a single document may be acceptable whereas when printing or copying of a large number of documents might suggest a determination of anomalous or malicious. Otherwise, a determination is made whether the user's current user behavior element is anomalous. If so, then the user's current user behavior element is marked as anomalous, followed by the performance of anomalous user behavior operations. In various embodiments, the anomalous user behavior operations can include an anomalous user behavior notification operation and/or an anomalous user response operation. In various embodiments, the anomalous user response operation can include a user blocking operation where an action is taken to restrict or remove user access to some or all of the user devices 230 and/or resources 250 and/or a risk level adjustment operation where a risk score associated with the user is adjusted based upon the anomalous behavior. In one embodiment, the anomalous user behavior element is stored for later review. In another embodiment, a security administrator 368 is notified of the anomalous user behavior element.

However, if it was determined that the user's current user behavior element was not anomalous, then it is marked as malicious (or unacceptable), followed by the performance of malicious behavior operations. In various embodiments, the malicious user behavior operations can include a malicious user behavior notification operation and/or a malicious user behavior response operation. In various embodiments, the malicious user response operation can include a user blocking operation where an action is taken to restrict or remove user access to some or all of the user devices 230 and/or resources 250 and/or a risk level adjustment operation where a risk score associated with the user is adjusted based upon the anomalous behavior. In one embodiment, the malicious user behavior element is stored for later review. In another embodiment, a security administrator 368 is notified of the malicious user behavior element. Thereafter, the current user behavior element, whether marked acceptable, anomalous, or malicious, is appended, as described in greater detail herein, to the user's user behavior profile. Once the user's user behavior activities have concluded, user behavior profile scoring and hashing operations, likewise described in greater detail herein, are performed to respectively generate a user behavior profile score and hash. The resulting user behavior profile score and hash are then appended to the user's user behavior profile. It will be appreciated that any order of the determination of whether a behavior element is acceptable, anomalous and malicious is contemplated.

In various embodiments, user behavior profiles are stored in a repository of user behavior profiles 370. In one embodiment, the repository of user behavior profiles 370 is implemented for use by a single user behavior monitoring system 118. In another embodiment, the repository of user behavior profiles 370 is implemented for use by a plurality of user behavior monitoring systems 118. In yet another embodiment, the repository of user behavior profiles 370 is implemented for use by a user behavior monitoring service 366. Skilled practitioners of the art will recognize that many such embodiments are possible. Accordingly, the foregoing is not intended to limit the spirit, scope or intent of the invention.

In various embodiments, a user behavior profile (e.g., user behavior profile 372) may identify known good behavior. In various embodiments, known good interactions between a user and an information handling system may be used to generate a user behavior profile identifying known good behavior. In various embodiments, the known good behavior corresponds to acceptable behavior 308. In various embodiments, additional interactions between the user and the user device are monitored to determine whether the additional interactions correspond to the known good behavior. In certain embodiments, the user behavior monitoring system 118 may perform an enforcement operation when the additional interactions do not correspond to the known good behavior. In certain embodiments, the enforcement operations can include anything from a denial of service to logging the interactions to generating a notification to a security administrator 368 regarding the interactions.

Figure 4:
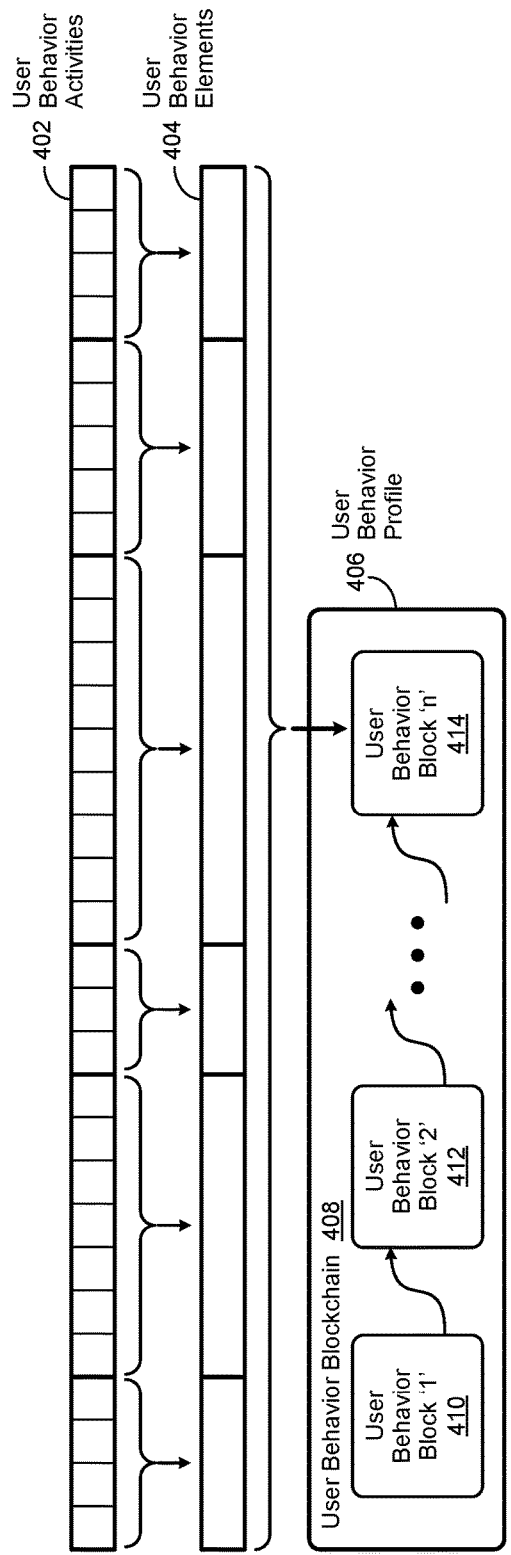
FIG. 4 is a simplified block diagram of a user behavior profile implemented as a blockchain.

FIG. 4 is a simplified block diagram of a user behavior profile implemented in accordance with an embodiment of the invention as a blockchain. As used herein, a blockchain broadly refers to a decentralized, distributed data structure whose contents may be replicated across a number of systems. These contents are stored in a chain of fixed structures commonly referred to as "blocks," such as user behavior block '1' 410, block '2' 412, and so forth, through block 'n' 414. Each of these blocks contains certain information about itself, such as a unique identifier, a reference to its previous block, and a hash value generated from the data it contains. As an example, user behavior block '2' 412 would contain a reference to user behavior block '1' 410, yet their respective hashes values would be different as they contain different data.

Those of skill in the art will be aware that blockchains may be implemented in different ways and for different purposes. However, these different implementations typically have certain common characteristics. For example, in certain instantiations blockchains are generally distributed across various systems, each of which maintains a copy of the blockchain. Updates to one copy of the blockchain, such as the addition of a user behavior block 'n' 414, results in corresponding updates to the other copies. Accordingly, the contents of the blockchain, including its most recent updates, are available to all participating users of the blockchain, who in turn use their own systems to authenticate and verify each new block. This process of authentication and verification ensures that the same transaction does not occur more than once. Furthermore with distributed types of block chains, the legitimacy of a given block, and its associated contents, is only certified once a majority of participants agree to its validity.

In general, the distributed and replicated nature of a blockchain, such as a user behavior blockchain 408, makes it difficult to modify historical records without invalidating any subsequent blocks added thereafter. As a result, the user behavior data within a given user behavior blockchain 408 is essentially immutable and tamper-evident. However, this immutability and tamper-evidence does not necessarily ensure that the user behavior data recorded in the cyber behavior blockchain 408 can be accepted as an incontrovertible truth. Instead, it simply means that what was originally recorded was agreed upon by a majority of the user behavior blockchain's 408 participants.

Additionally in certain embodiments, every transaction in a blockchain is serialized (i.e., stored in a sequence). Additionally in certain embodiments, every transaction in a block chain is time-stamped, which is useful for tracking interactions between participants and verifying various information contained in, or related to, a blockchain. Furthermore, instructions can be embedded within individual blocks of a blockchain. These instructions, in the form of computer-executable code, allow transactions or other operations to be initiated if certain conditions are met.

Referring now to FIG. 4, groups of user behavior activities 402, described in greater detail herein, are combined in various embodiments to generate one or more associated user behavior elements 404, likewise described in greater detail herein. In certain embodiments, the resulting one or more user behavior elements 404 are in turn combined to generate a user behavior block, such as user behavior block 'n' 414. The resulting user behavior block is then appended to a target user behavior blockchain, such as user behavior blockchain 408. As used herein, a user behavior block broadly refers to a blockchain block implemented to contain various user behavior data. As likewise used herein, user behavior data broadly refers to any data associated with a user's user behavior, as described in greater detail herein.

In various embodiments, a user behavior blockchain 408 is implemented to contain one or more user behavior profiles 406, described in greater detail herein. In one embodiment, the user behavior blockchain 408 contains a single user behavior profile 406, which in turn is associated with an individual user. In this embodiment, user behavior blocks '1' 410 and '2' 412 through 'n' 414 are associated with the individual user. In another embodiment, the user behavior blockchain 408 is implemented to include user behavior profiles 406 associated with two or more users. In this embodiment, individual user behavior blocks '1' 410 and '2' 412 through 'n' 414 are respectively associated with two or more user behavior profiles 406, which in turn are respectively associated with a particular user. In certain embodiments, the user behavior blockchain 408 is parsed to identify which of the user behavior blocks '1' 410 and '2' 412 through 'n' 414 are associated with a given user behavior profile 406, which in turn are respectively associated with a particular user.

In various embodiments, data associated with a given user behavior blockchain 408 is used in the performance of user behavior monitoring operations to detect acceptable, anomalous, and malicious behavior enacted by a user. In certain embodiments, the performance of these user behavior monitoring operations involve comparing a newly-generated user behavior block, such as user behavior block 'n' 414 to previously-generated user behavior blocks, such as user behavior blocks '1' 410 and '2' 412.

In certain embodiments, if the contents of the user behavior block 'n' 414 are substantively similar to the contents of user behavior blocks '1' 410 and '2' 412, then the behavior of the user may be judged to be acceptable. However, if the contents of the user behavior block 'n' 414 are substantively dissimilar to the contents of user behavior blocks '1' 410 and '2' 412, then the behavior of the user may be judged to be anomalous or malicious. In these embodiments, the method by which the contents of user behavior block 'n' 414 are determined to be substantively similar, or dissimilar, to the contents of user behavior blocks '1' 410 and '2' 412 is a matter of design choice.

Figure 5:
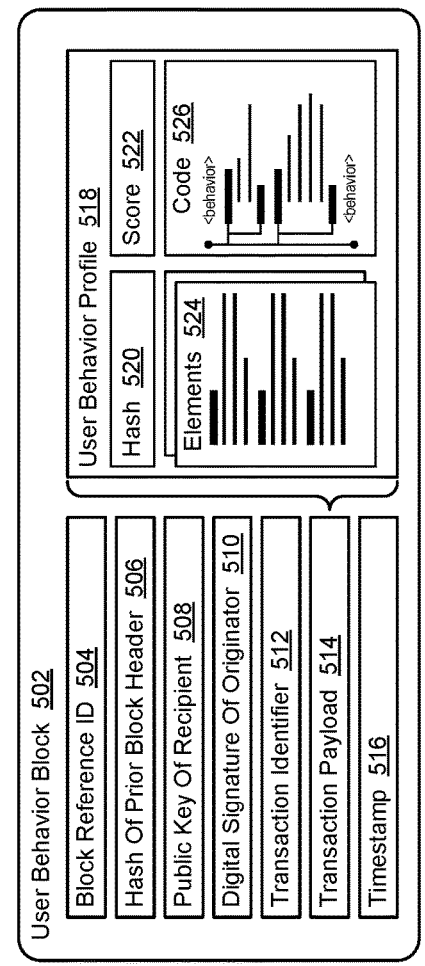
FIG. 5 is a simplified block diagram of a user behavior block in a blockchain.

FIG. 5 is a simplified block diagram of a user behavior block in a blockchain implemented in accordance with an embodiment of the invention. In various embodiments, a blockchain user behavior blockchain 408, as shown in FIG. 4, may contain one or more user behavior blocks 502, such as user behavior block '1' 410, '2' 412, and so forth through 'n' 414, likewise shown in FIG. 4. In these embodiments, each user behavior block 502 may include either or both data and metadata, such as a block reference identifier (ID) 504, a hash value of the prior user behavior block's header 506 information, the public key of the recipient 508 of the user behavior blockchain 408 transaction, and the digital signature of the originator 510 of the user behavior blockchain 408 transaction. The user behavior block 502 may likewise include additional either or both data and metadata, such as a user behavior blockchain transaction identifier 512, a transaction payload 514, and a transaction timestamp 516.

In certain embodiments, the transaction payload 514 may include one or more user behavior profiles 518. In various embodiments, a user behavior profile 518 may include various user behavior elements 524, described in greater detail herein, and a hash 520 value of the user behavior elements 524. In certain embodiments, the hash 520 value is implemented to determine whether the integrity of the user behavior elements 524 has been compromised. In various embodiments, the user behavior profile 518 may include executable code 526. In certain embodiments, the executable code 526 may be used by a user behavior monitoring system, described in greater detail herein, to detect acceptable, anomalous, and malicious behavior being enacted by a user. In various embodiments, user behavior data contained in one or more user behavior elements 524 is used in combination with the executable code to perform user behavior monitoring operations, likewise described in greater detail herein.

In certain embodiments, the executable code 526 can include state information such as pre-calculated information associated with one or more user behavior elements 524. In certain embodiments, the executable code 526 can include a model of good behavior (e.g., known good behavior) which is used when detecting acceptable, anomalous, and malicious behavior being enacted by a user. In certain embodiments, the model includes a series of rules of behaviors that might lead to a determination regarding trustworthiness. In certain embodiments, the series of rules can include communication related rules, data movement related rules and/or programming modification type rules. In certain embodiments, such a model may be implemented to enable a user behavior monitoring system to assess the intent of a user. In certain embodiments, the executable code 526 may include instructions that may be implemented to notify a user behavior monitoring system if certain user behavior associated with a first user behavior block 502 is inconsistent with a second user behavior block 502.

In certain embodiments, the user behavior block 502 may also contain a risk score 522. In certain embodiments, the risk score 522 includes a user behavior score. In various embodiments, the risk score 522 may be used by a user behavior monitoring system to assess the state (e.g., the risk or trustworthiness) of a particular user while enacting a given user behavior. In certain embodiments, the state may also be stored within the user behavior block 502. In certain embodiments, the state is assessed at a specific time and has a time associated with the state. In one embodiment, the user behavior score 522 might be associated with a particular user behavior element, such as accessing sensitive human resource documents. In one embodiment, the user behavior score 522 might be related to a user's overall user behavior. In various embodiments, the user behavior block 502 may also contain information regarding how the user behavior score was generated such as the model that was used to generate the user behavior score 522. Storing this information provides a historical view of how the score was generated when the score was generated. This information can be useful in identifying what type of user behavior led to the user behavior score (e.g., what was the anomaly).

As an example, a user may have a high user behavior score 522 for general cyberspace activity, but a low user behavior score 522 for accessing an organization's financial data. To continue the example, the user's role in the organization may be related to maintaining a physical facility. In that role, the user may requisition cleaning supplies and schedule other users to perform maintenance. Accordingly, attempting to access the organization's financial data, particularly over a weekend, would indicate anomalous, or possibly malicious, behavior. To further continue the example, such an attempt may result in a low user behavior score 522 being assigned to that particular user behavior element. Those of skill in the art will recognize that many such embodiments and examples are possible. Accordingly, the foregoing is not intended to limit the spirit, scope or intent of the invention. In certain embodiments, the user behavior score 522 may change as a result of information obtained from a third party and not just from observable behavior. For example, in another type of score if a credit score of a user changes, or the user performs a wire transfer to a known suspicious location, then the user behavior score 522 may be changed based upon this information.

In certain embodiments, the transaction timestamp 516 may be implemented to provide temporal information to a user behavior monitoring system. In certain embodiments, the temporal information may be implemented in a multi-layer user behavior profile, described in greater detail herein. In certain embodiments, the temporal information may be used by the user behavior monitoring system to compare current user behavior to past user behavior, as likewise described in greater detail herein. In certain embodiments, the results of such comparisons may indicate whether the current user behavior is acceptable, anomalous or malicious.

As an example, comparison of two user behavior blocks 502, one generated 90 days in the past and the other 60 days in the past, exhibit consistent user behavior. However, comparison of a user behavior block 502 generated within the last 24 hours to the two previously-generated user behavior blocks 502 indicates inconsistent user behavior. Accordingly, the inconsistent user behavior associated with the most recently generated user behavior block may be anomalous or malicious.

Figure 6:
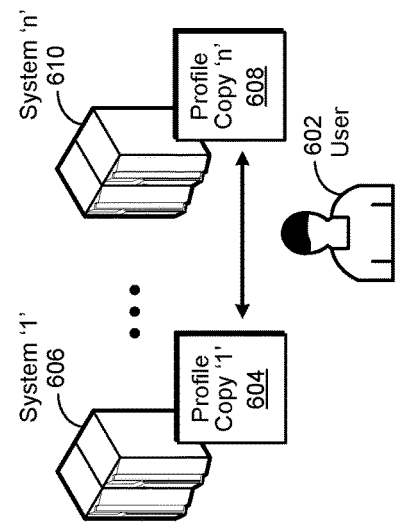
FIG. 6 is a simplified block diagram of a transportable user behavior profile.

FIG. 6 is a simplified block diagram of a transportable user behavior profile implemented in accordance with an embodiment of the invention. In this embodiment, a user behavior profile 406 for a user 602 may be implemented as a user behavior blockchain 408, as shown in FIG. 4. In various embodiments a first copy of the user behavior profile 406, profile copy '1' 604 is used by a first system, system '1' 606, and additional copies, profile copy 'n' 608, are used by additional systems 'n' 608 to perform various user behavior monitoring operations. In certain embodiments, additions to profile copy '1' 604 of the user behavior profile 408 results in the same additions to profile copies 'n' 608. As a result, systems '1' 606 through 'n' 608 are kept in synch regarding the user's 602 user behavior. Accordingly, each system '1' 604 through 'n' 610 is apprised of any anomalous or malicious user behavior enacted by the user 602, regardless of which system was being used when the anomalous or malicious behavior occurred.

Figure 7A:
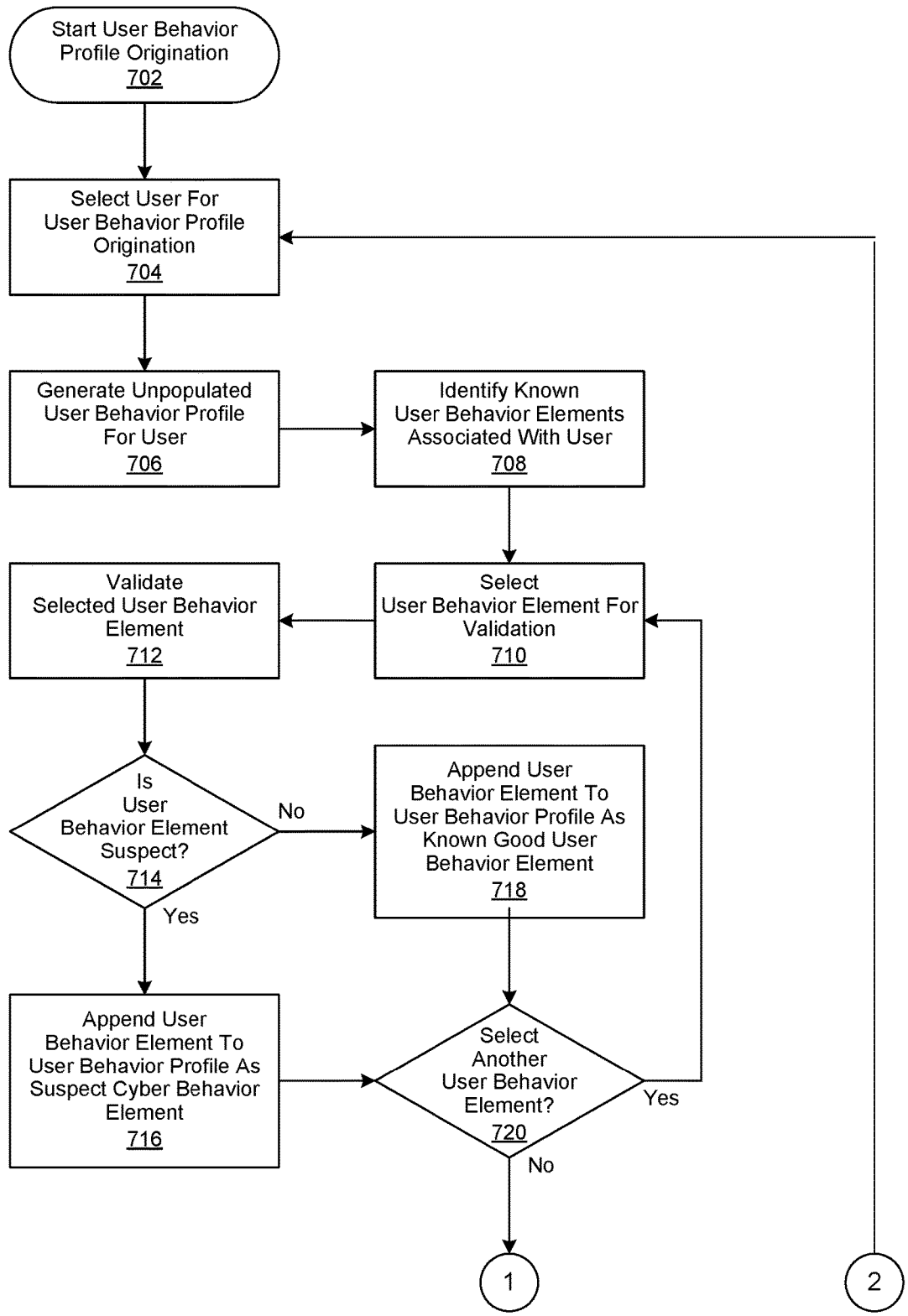
FIGS. 7a and 7b are a generalized flowchart of the performance of user behavior profile origination operations.
Figure 7B:
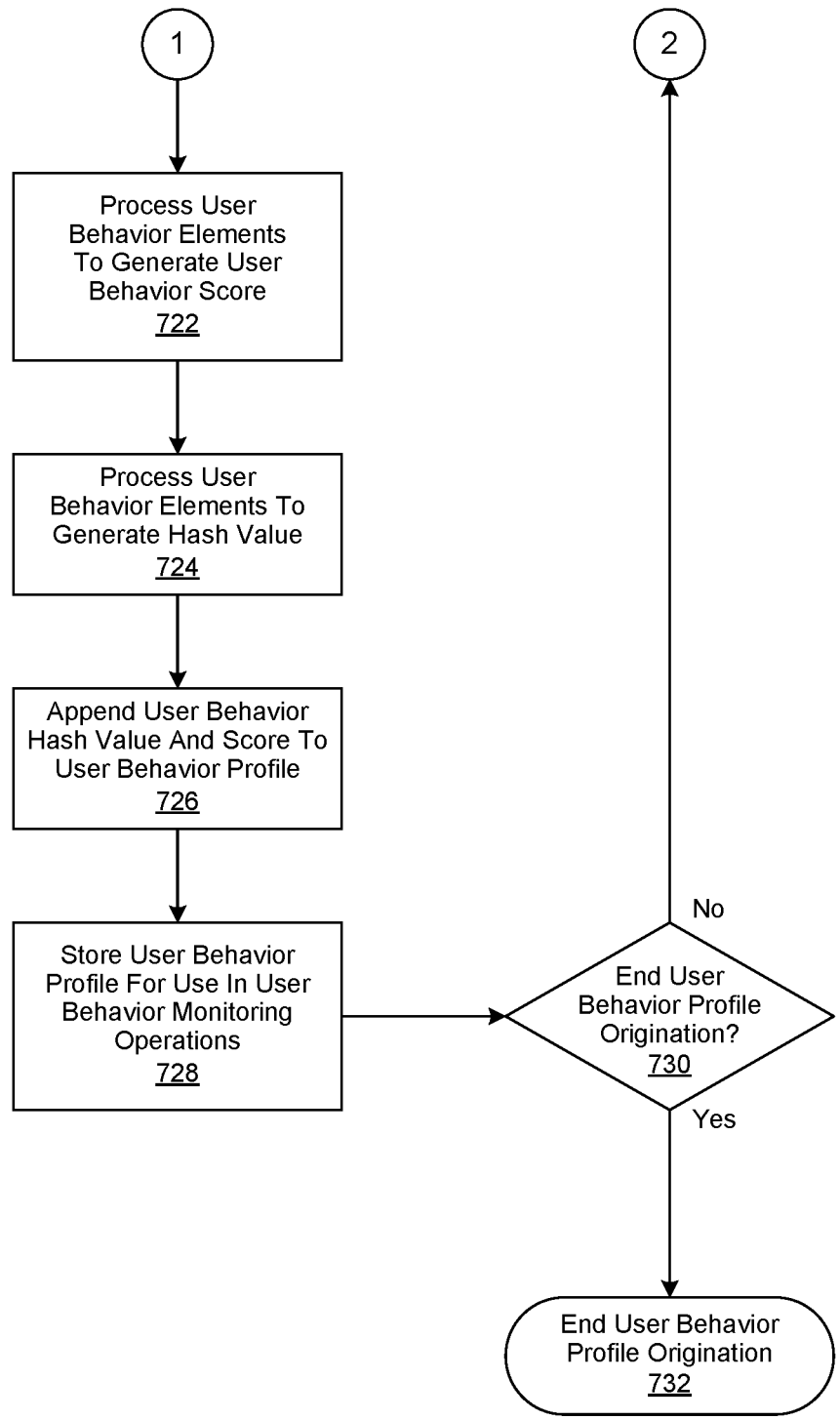

FIGS. 7a and 7b are a generalized flowchart of the performance of user behavior profile origination operations in accordance with an embodiment of the invention. In this embodiment, user behavior profile origination operations are begun in step 702, followed by the selection of a target user in step 706 for user behavior profile origination. An unpopulated user behavior profile is then generated for the selected user in step 706, followed by the identification of known user behavior elements associated with the selected user in step 708.

A user behavior element associated with the user is then selected for validation in step 710, followed by the performance of user behavior validation operations in step 712 to determine whether the selected user behavior element is suspect. In various embodiments, the method by which the user behavior element is validated is a matter of design choice. A determination is then made in step 714 whether the user behavior element is suspect. If so, then the user behavior element is appended as a suspect user behavior element to the user's user behavior profile in step 716. Otherwise, the user behavior element is appended to the user's user behavior profile in step 718.

Thereafter, or once the suspect user behavior element is appended to the user's user behavior profile in step 716, a determination is made in step 720 whether to select another user behavior element for validation. If so, the process is continued, proceeding with step 710. Otherwise, user behavior elements that have been appended to the user behavior profile are processed in step 722 to generate a user behavior hash value, described in greater detail herein. Then, in step 724, the user behavior elements that have been appended to the user behavior profile are processed to generate a user behavior score, likewise described in greater detail herein. The resulting user behavior hash value and score are then appended to the user behavior profile in step 726.

In turn, the user behavior profile is stored in step 728 for use in user behavior monitoring operations. In one embodiment, the user behavior profile is stored in a repository of user behavior profiles. In another embodiment, the repository of user behavior profiles is implemented for use by a single user behavior monitoring system. In yet another embodiment, the repository of user behavior profiles is implemented for use by a plurality of user behavior monitoring systems. In various embodiments, the user behavior profile is stored in a user behavior blockchain, described in greater detail herein. A determination is then made in step 730 whether to end user behavior profile origination operations. If not, the process is continued, proceeding with step 704. Otherwise, user behavior profile origination operations are ended in step 732.

Figure 8A:
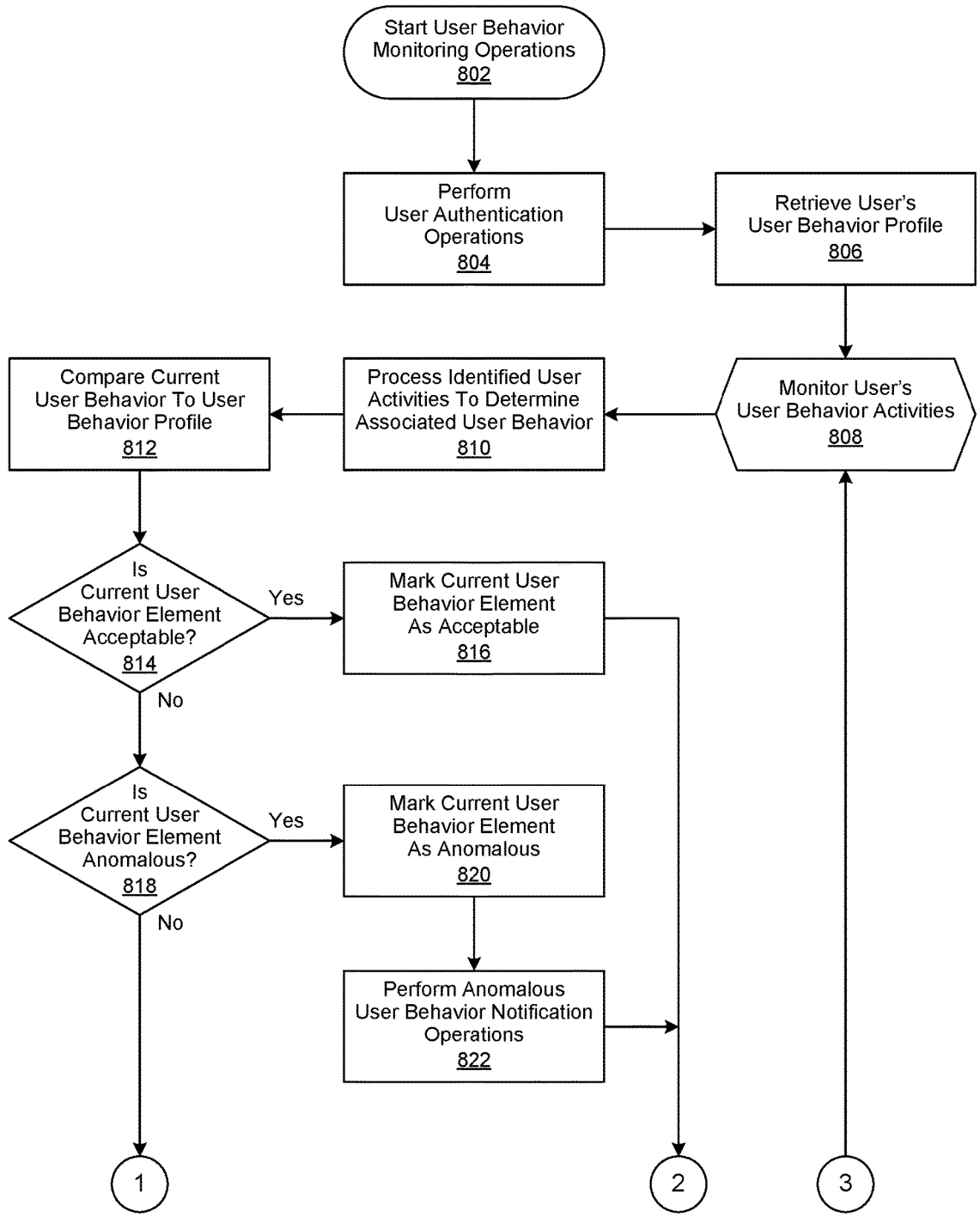
FIGS. 8a and 8b are a generalized flowchart of the performance of user behavior monitoring operations to detect acceptable, anomalous, and malicious cyber behavior.
Figure 8B:
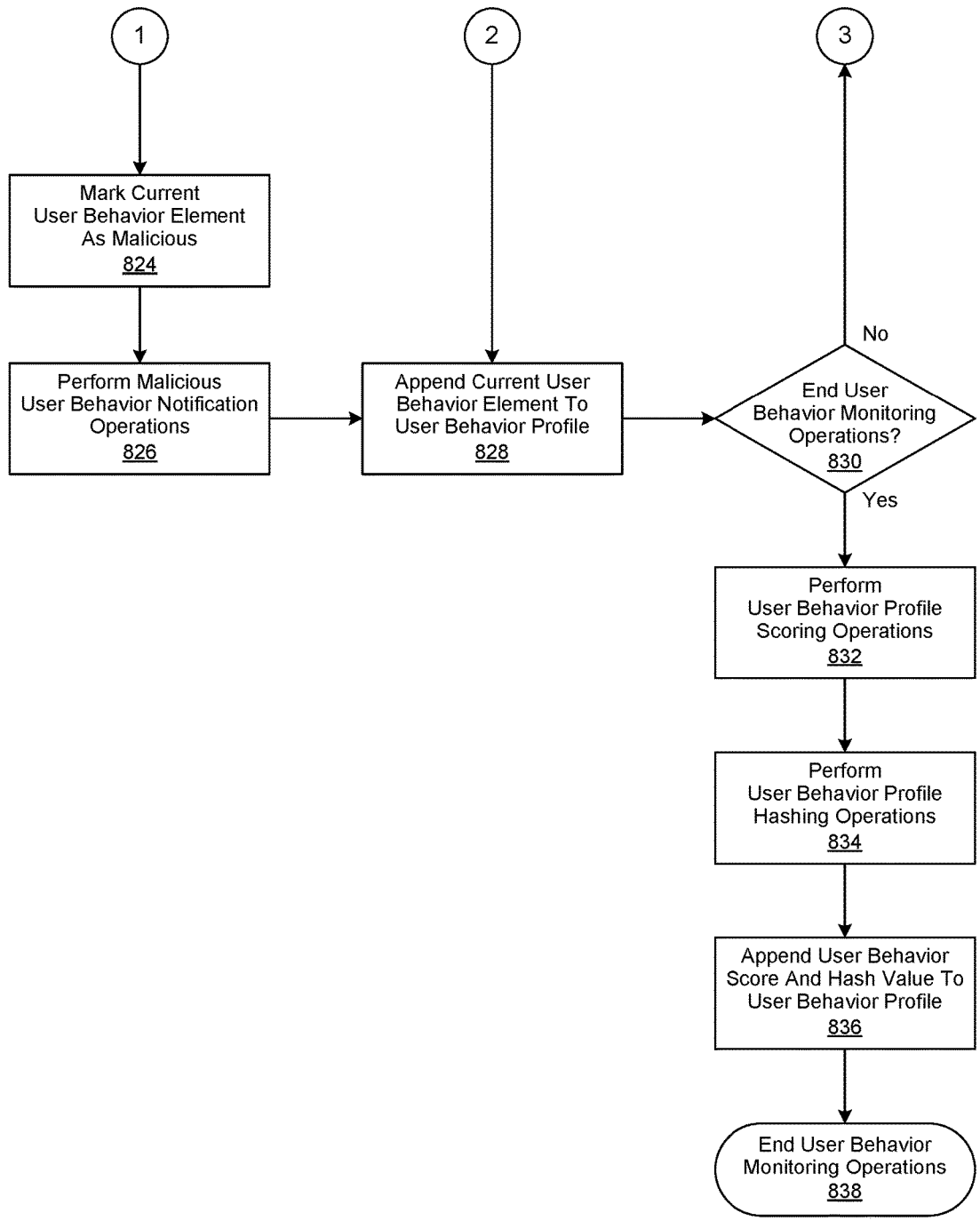

FIG. 8 is a generalized flowchart of the performance of user behavior monitoring operations implemented in accordance with an embodiment of the invention to detect acceptable, anomalous, and malicious user behavior. In this embodiment, user behavior monitoring operations are begun in step 802, followed by the performance of user authentication operations, familiar to those of skill in the art, in step 804. Then, in step 806, the user's user behavior profile is retrieved, followed by the ongoing monitoring of the user's user behavior activities in step 808. The user's user behavior activities are processed in step 810 to determine their associated user behavior element, which is then compared to the user's user behavior profile in step 812.

A determination is then made in step 814 whether the user's current user behavior element is acceptable. If so, then the user behavior element is marked as acceptable in block 816. Otherwise, a determination is made in step 818 whether the user's current user behavior element is anomalous. If so, then the current user behavior element is marked as anomalous in step 820, followed by the performance of anomalous user behavior operations in step 822. In one embodiment, the anomalous user behavior is stored for later review. In another embodiment, a security administrator is notified of the anomalous user behavior. However, if it was determined in step 818 that the current user behavior element is not anomalous, then the current user behavior element is marked as malicious in step 824, followed by the performance of malicious user behavior operations in step 826. Thereafter, or once the current user behavior element has been marked as acceptable or anomalous in steps 816 or 820, the current user behavior element is appended to the user's user behavior profile in step 828.

A determination is then made in step 830 whether to end user behavior monitoring operations. If not, then the process continues, proceeding with step 808. Otherwise, user behavior profile scoring operations, described in greater detail herein, are performed in step 832 to generate a user behavior score. User behavior hashing operations, likewise described in greater detail herein, are then performed in step 834 to generate a user behavior hash values. The resulting cyber behavior score and hash value are then appended to the user's user behavior profile in step 836. User behavior monitoring operations are then ended in step 838.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for generating a cyber behavior profile, comprising:
monitoring electronically-observable user behavior;
converting the electronically-observable user behavior into electronic information representing the electronically-observable user behavior, the electronic information representing the user interactions comprising temporal detail corresponding to the user interaction, the temporal detail corresponding to a plurality of temporal user behavior factors associated with the user interaction, at least one temporal user behavior factor being implemented as an ontological time user behavior factor, the ontological time user behavior factor referring to how one instant in time relates to another instant in time in a chronological sense, at least one temporal user behavior factor is implemented as a societal time user behavior factor, the societal time user behavior factor referring to how a user interaction at a particular instant in time correlates to another user interaction at another particular instant in time;

generating a user behavior profile based upon the electronic information representing the electronically-observable user behavior, the generating the user profile including information relating to the temporal detail corresponding to the user interaction, the user behavior profile comprising at least one of the ontological time user behavior factor and the societal time user behavior factor; and, using the user behavior profile with at least one of the ontological time user behavior factor and the societal time user behavior factor to determine whether a particular user behavior is one of acceptable, anomalous and malicious.

2. The method of claim 1, wherein:
the plurality of temporal user behavior factors comprise a date/time/frequency user behavior factor.

3. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
monitoring electronically-observable user behavior;
converting the electronically-observable user behavior into electronic information representing the electronically-observable user behavior, the electronic information representing the user interactions comprising temporal detail corresponding to the user interaction, the temporal detail corresponding to a plurality of temporal user behavior factors associated with the user interaction, at least one temporal user behavior factor being implemented as an ontological time user behavior factor, the ontological time user behavior factor referring to how one instant in time relates to another instant in time in a chronological sense, at least one temporal user behavior factor is implemented as a societal time user behavior factor, the societal time user behavior factor referring to how a user interaction at a particular instant in time correlates to another user interaction at another particular instant in time;
generating a user behavior profile based upon the electronic information representing the electronically-observable user behavior, the generating the user profile including information relating to the temporal detail corresponding to the user interaction, the user behavior profile comprising at least one of the ontological time user behavior factor and the societal time user behavior factor; and, using the user behavior profile with at least one of the ontological time user behavior factor and the societal time user behavior factor to determine whether a particular user behavior is one of acceptable, anomalous and malicious.

4. The system of claim 3, wherein:
the plurality of temporal user behavior factors comprise a date/time/frequency user behavior factor.

5. A non-transitory, computer-readable storage medium embodying computer program code, the computer program code comprising computer executable instructions configured for:
monitoring electronically-observable user behavior;
converting the electronically-observable user behavior into electronic information representing the electronically-observable user behavior, the electronic information representing the user interactions comprising temporal detail corresponding to the user interaction, the temporal detail corresponding to a plurality of temporal user behavior factors associated with the user interaction, at least one temporal user behavior factor being implemented as an ontological time user behavior factor, the ontological time user behavior factor referring to how one instant in time relates to another instant in time in a chronological sense, at least one temporal user behavior factor is implemented as a societal time user behavior factor, the societal time user behavior factor referring to how a user interaction at a particular instant in time correlates to another user interaction at another particular instant in time;
generating a user behavior profile based upon the electronic information representing the electronically-observable user behavior, the generating the user profile including information relating to the temporal detail corresponding to the user interaction, the user behavior profile comprising at least one of the ontological time user behavior factor and the societal time user behavior factor; and, using the user behavior profile with at least one of the ontological time user behavior factor and the societal time user behavior factor to determine whether a particular user behavior is one of acceptable, anomalous and malicious.

6. The non-transitory, computer-readable storage medium of claim 5, wherein:
the plurality of temporal user behavior factors comprise a date/time/frequency user behavior factor.

7. The non-transitory, computer-readable storage medium of claim 5, wherein:
the computer executable instructions are deployable to a client system from a server system at a remote location.

8. The non-transitory, computer-readable storage medium of claim 5, wherein:
the computer executable instructions are provided by a service provider to a user on an on-demand basis.

* * * * *